United States Patent
Block et al.

(10) Patent No.: US 8,361,912 B2
(45) Date of Patent: *Jan. 29, 2013

(54) HOOD, DASH, FIREWALL OR ENGINE COVER LINER

(75) Inventors: Thomas L. Block, Howell, MI (US); Lee A. Staelgraeve, Lambertville, MI (US); Jeffrey A. Tilton, Goshen, KY (US); Paul W. Poole, Huntersville, NC (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 2543 days.

This patent is subject to a terminal disclaimer.

(21) Appl. No.: 10/159,539

(22) Filed: May 31, 2002

(65) Prior Publication Data
US 2003/0008592 A1 Jan. 9, 2003

Related U.S. Application Data

(63) Continuation-in-part of application No. 09/607,478, filed on Jun. 30, 2000, now Pat. No. 6,572,723.

(60) Provisional application No. 60/295,431, filed on Jun. 1, 2001.

(51) Int. Cl.
*D04H 1/00* (2006.01)

(52) U.S. Cl. .................................. 442/327; 442/394

(58) Field of Classification Search .................. 442/327, 442/394; 428/311.51, 311.11, 319.3, 319.9
See application file for complete search history.

(56) References Cited

U.S. PATENT DOCUMENTS

| | | | |
|---|---|---|---|
| 3,652,377 A | 3/1972 | Helmick | |
| 3,752,060 A | 8/1973 | Hubert et al. | |
| 3,764,454 A | 10/1973 | Healy et al. | |
| 3,787,278 A | 1/1974 | Ready et al. | |
| 3,816,233 A | 6/1974 | Powers | |
| 3,936,555 A | 2/1976 | Smith, II | |
| 3,975,562 A | 8/1976 | Madebach et al. | |
| 4,016,318 A | 4/1977 | DiGioia et al. | |
| 4,020,207 A | 4/1977 | Alfter et al. | |
| 4,131,664 A | 12/1978 | Flowers et al. | |
| 4,199,635 A | 4/1980 | Parker | |
| 4,242,398 A | 12/1980 | Segawa et al. | |
| 4,245,689 A * | 1/1981 | Grard et al. | 162/134 |
| 4,282,283 A | 8/1981 | George et al. | |
| 4,377,614 A | 3/1983 | Alfter et al. | |
| 4,379,801 A | 4/1983 | Weaver et al. | |
| 4,379,802 A | 4/1983 | Weaver et al. | |

(Continued)

FOREIGN PATENT DOCUMENTS
CA 2399614 8/2001
DE 41 26 884 2/1993
(Continued)

OTHER PUBLICATIONS

Translation of JP 10-060763, Ino et al, Mar. 3, 1998, 12 pages.*

(Continued)

*Primary Examiner* — Hai Vo
(74) *Attorney, Agent, or Firm* — Calfee, Halter & Griswold LLP

(57) ABSTRACT

A hood, dash, firewall or engine cover liner is provided for a vehicle. The liner includes a nonlaminate acoustical and thermal insulating layer of polymer fiber that shows no signs of any thickness increase, delamination, deterioration or any undesirable effect which may affect performance for at least 330 hours when maintained at a temperature of at least approximately 150° C. The liner may include a relatively high density, nonlaminate skin of polymer fiber and/or one or more facing layers constructed from polymer material.

22 Claims, 2 Drawing Sheets

U.S. PATENT DOCUMENTS

| | | |
|---|---|---|
| 4,395,455 A | 7/1983 | Frankosky |
| 4,418,031 A | 11/1983 | Doerer et al. |
| 4,432,580 A | 2/1984 | Lohmar et al. |
| 4,539,252 A | 9/1985 | Franz |
| 4,539,254 A | 9/1985 | O'Connor et al. |
| 4,568,581 A | 2/1986 | Peoples, Jr. |
| 4,578,307 A * | 3/1986 | Niki et al. ............. 442/402 |
| 4,579,764 A | 4/1986 | Peoples, Jr. et al. |
| 4,619,344 A | 10/1986 | Uesugi et al. |
| 4,711,685 A | 12/1987 | Hillman |
| 4,729,917 A | 3/1988 | Symdra et al. |
| 4,770,919 A | 9/1988 | Tesch |
| 4,824,507 A | 4/1989 | D'Amico |
| 4,851,274 A | 7/1989 | D'Elia |
| 4,851,283 A | 7/1989 | Holtrop et al. |
| 4,888,234 A | 12/1989 | Smith et al. |
| 4,888,235 A * | 12/1989 | Chenoweth et al. ........ 442/342 |
| 4,940,112 A | 7/1990 | O'Neill |
| 4,946,738 A | 8/1990 | Chenoweth et al. |
| 4,948,660 A | 8/1990 | Rias et al. |
| 4,985,106 A | 1/1991 | Nelson |
| 5,047,198 A | 9/1991 | Kim |
| 5,055,341 A | 10/1991 | Yamaji et al. |
| 5,066,351 A | 11/1991 | Knoll |
| 5,079,074 A | 1/1992 | Steagall et al. |
| 5,094,318 A | 3/1992 | Maeda et al. |
| 5,108,691 A | 4/1992 | Elliott |
| 5,164,254 A | 11/1992 | Todd et al. |
| 5,204,042 A | 4/1993 | James et al. |
| 5,233,021 A | 8/1993 | Sikorski |
| 5,272,000 A | 12/1993 | Chenoweth et al. |
| 5,283,111 A | 2/1994 | Schlecker |
| 5,296,657 A | 3/1994 | Gilliland et al. |
| 5,298,319 A | 3/1994 | Donahue et al. |
| 5,298,694 A | 3/1994 | Thompson et al. |
| 5,376,322 A | 12/1994 | Younessian |
| 5,436,046 A | 7/1995 | Sakamoto |
| 5,456,872 A * | 10/1995 | Ahrweiler ............. 264/115 |
| 5,470,424 A | 11/1995 | Isaac et al. |
| 5,501,898 A * | 3/1996 | Fottinger et al. ............. 442/364 |
| 5,516,580 A | 5/1996 | Frenette et al. |
| 5,543,193 A | 8/1996 | Tesch |
| 5,549,776 A | 8/1996 | Juriga |
| 5,591,289 A | 1/1997 | Frost et al. |
| 5,624,726 A | 4/1997 | Sanocki et al. |
| 5,633,064 A | 5/1997 | Ragland et al. |
| 5,719,198 A * | 2/1998 | Young et al. ............. 521/40.5 |
| 5,741,380 A | 4/1998 | Hoyle et al. |
| 5,743,985 A | 4/1998 | Ernest et al. |
| 5,744,763 A | 4/1998 | Iwasa et al. |
| 5,749,993 A | 5/1998 | Denney et al. |
| 5,756,026 A | 5/1998 | Sanchez et al. |
| 5,759,659 A | 6/1998 | Sanocki et al. |
| 5,767,024 A | 6/1998 | Anderson et al. |
| 5,773,375 A * | 6/1998 | Swan et al. ............. 442/340 |
| 5,800,905 A | 9/1998 | Sheridan et al. |
| 5,817,408 A | 10/1998 | Orimo et al. |
| 5,841,081 A | 11/1998 | Thompson et al. |
| 5,872,067 A | 2/1999 | Meng et al. |
| 5,886,306 A | 3/1999 | Patel et al. |
| 5,932,331 A | 8/1999 | Jones et al. |
| 5,958,603 A | 9/1999 | Ragland et al. |
| RE36,323 E | 10/1999 | Thompson et al. |
| 5,961,904 A | 10/1999 | Swan et al. |
| 5,972,445 A | 10/1999 | Kimura et al. |
| 5,975,609 A | 11/1999 | Campbell |
| 5,979,962 A | 11/1999 | Valentin et al. |
| 6,008,149 A | 12/1999 | Copperwheat |
| 6,066,388 A * | 5/2000 | Van Kerrebrouck .......... 428/218 |
| 6,092,622 A | 7/2000 | Hiers et al. |
| 6,102,465 A | 8/2000 | Nemoto et al. |
| 6,123,172 A | 9/2000 | Byrd et al. |
| 6,165,921 A | 12/2000 | Nagata et al. |
| 6,217,691 B1 | 4/2001 | Vair et al. |
| 6,539,955 B1 * | 4/2003 | Tilton et al. ............. 134/58 D |
| 6,572,723 B1 * | 6/2003 | Tilton et al. ............. 156/219 |
| 6,599,850 B1 | 7/2003 | Feifetz |
| 6,669,265 B2 * | 12/2003 | Tilton et al. ............. 296/146.1 |
| 6,726,980 B2 * | 4/2004 | Staelgraeve et al. .......... 428/192 |
| 6,900,145 B2 * | 5/2005 | Tilton et al. ............. 442/181 |
| 6,955,845 B1 * | 10/2005 | Poole et al. ............. 428/76 |
| 7,166,547 B2 | 1/2007 | Tilton et al. |
| 7,226,879 B2 * | 6/2007 | Tilton et al. ............. 442/327 |
| 8,039,091 B2 * | 10/2011 | Tilton et al. ............. 428/195.1 |

FOREIGN PATENT DOCUMENTS

| | | |
|---|---|---|
| DE | 44 39 415 | 5/1996 |
| DE | 197 44 682 | 4/1998 |
| EP | 0 909 680 | 4/1999 |
| EP | 1554345 | 12/2007 |
| GB | 1421875 | 1/1976 |
| GB | 1 536 876 | 12/1978 |
| JP | 1-124530 | 4/1977 |
| JP | 56-13160 | 2/1981 |
| JP | 56-99670 | 8/1981 |
| JP | 59-200297 | 11/1984 |
| JP | 63-122151 | 5/1988 |
| JP | 4-282098 | 10/1992 |
| JP | 5-132841 | 5/1993 |
| JP | 6-166942 | 6/1994 |
| JP | 6-212546 | 8/1994 |
| JP | 6-259081 | 8/1994 |
| JP | 7-219555 | 8/1995 |
| JP | 8-076768 | 3/1996 |
| JP | 10-060763 A | 3/1998 |
| JP | 10-245755 | 9/1998 |
| JP | 10-228285 | 11/1998 |
| JP | 11-034760 | 5/1999 |
| JP | 11-189456 | 7/1999 |
| JP | 11-240088 | 7/1999 |
| JP | 10-236204 | 9/1999 |
| JP | 11 180224 | 10/1999 |
| JP | 2000-096734 | 4/2000 |
| JP | 2000-303397 | 10/2000 |
| JP | 2001-030397 | 2/2001 |
| JP | 2001-129926 | 5/2001 |
| JP | 2002-086490 | 3/2002 |
| WO | 02/02302 | 1/2002 |
| WO | 02/098643 | 12/2002 |
| WO | 02/098647 | 12/2002 |
| WO | 02/098707 | 12/2002 |

OTHER PUBLICATIONS

Translation of JP 08-290503, Akisuke et al, "Automotive Interior Decorative Material and Its Manufacture," Nov. 5, 1996.*
International Search Report from PCT/US01/19976 dated Feb. 15, 2002.
International Preliminary Examination Report from PCT/US01/19976 dated Oct. 7, 2002.
International Search Report from PCT/US02/16691 dated Sep. 20, 2002.
International Preliminary Examination Report from PCT/US02/16691 dated Sep. 17, 2003.
International Search Report from PCT/US02/16703 dated Sep. 5, 2002.
International Preliminary Examination Report from PCT/US02/16703 dated Jul. 25, 2003.
International Search Report from PCT/US02/16418 dated Jan. 24, 2003.
International Preliminary Examination Report from PCT/US02/16418 dated Sep. 16, 2003.
Office action from U.S. Appl. No. 10/160,076 dated Mar. 15, 2004.
Office action from U.S. Appl. No. 10/160,076 dated Nov. 4, 2004.
Advisory action from U.S. Appl. No. 10/160,076 dated Jan. 21, 2005.
Advisory action from U.S. Appl. No. 10/160,076 dated Feb. 11, 2005.
Office action from U.S. Appl. No. 10/160,076 dated Mar. 10, 2005.
Office action from U.S. Appl. No. 10/160,076 dated Nov. 3, 2005.
Office action from U.S. Appl. No. 10/160,076 dated Apr. 14, 2006.
Notice of Allowance from U.S. Appl. No. 10/160,076 dated Sep. 20, 2006.
Office action from Brazilian Application No. PI 0209573-4 dated Dec. 14, 2010.
Communication from EP Application No. 01950390.3 dated May 2, 2005.

Communication from EP Application No. 01950390.3 dated Oct. 26, 2004.
Communication from EP Application No. 01950390.3 dated Jan. 14, 2004.
Communication from EP Application No. 01950390.3 dated May 16, 2003.
Communication from EP Application No. 02739433.7 dated Jul. 19, 2005.
Communication from EP Application No. 02739433.7 dated Jun. 4, 2004.
Comunication from EP Application No. 02726927.3 dated Apr. 19, 2005.
Communication from EP Application No. 02726927.3 dated Sep. 10, 2004.
Communication from EP Application No. 02737137.6 dated Apr. 23, 2010.
Communication from EP Application No. 02737137.6 dated Apr. 5, 2007.
Communication from EP Application No. 02737137.6 dated Dec. 12, 2005.
Office action from Japanese Application No. 2003-501663 dated Aug. 11, 2006.
Office action from Japanese Application No. 2003-501667 dated Apr. 12, 2006.
Office action from Japanese Application No. 2003-501667 dated Feb. 13, 2007.
Office action from Japanese Application No. 2003-501667 dated Oct. 1, 2007.
Telephone Interview Summary from Japanese Application No. 2003-501667 dated Mar. 28, 2008.
Office action from Japanese Application No. 2003-501667 dated May 7, 2008.
Office action from Mexican Application No. 03/10234 dated May 30, 2008.
Office action from Mexican Application No. 03/10933 dated Jul. 10, 2006.
Office action from Brazilian Patent Application No. PI0209573-4 dated Aug. 22, 2011.
Office action from Brazilian Application No. PI 0209574-2 dated May 17, 2011.
Office action from Japanese Application No. 2003-501718 dated Aug. 21, 2007.
Office action from U.S. Appl. No. 09/607,478 dated Sep. 24, 2002.
Notice of Allowance from U.S. Appl. No. 09/607,478 dated Jan. 28, 2003.
Office action from U.S. Appl. No. 10/160,776 dated Apr. 21, 2003.
Notice of Allowance from U.S. Appl. No. 10/160,776 dated Sep. 4, 2003.
Office action from Canadian Application No. 2,444,641 dated Sep. 11, 2008.
Office action from Canadian Application No. 2,444,639 dated Mar. 23, 2009.
Office action from Brazilian Patent Application No. PI0209574-2 dated May 17, 2011.

* cited by examiner

HOOD, DASH, FIREWALL OR ENGINE COVER LINER

This application is a continuation-in-part of U.S. patent application Ser. No. 09/607,478, Jun. 30, 2000 now U.S. Pat. No. 6,572,723, and claims the benefit of U.S. Patent Application Ser. No. 60/295,431, filed Jun.1, 2001.

TECHNICAL FIELD AND INDUSTRIAL APPLICABILITY OF THE INVENTION

The present invention relates generally to the field of acoustical and thermal insulation and, more particularly, to a hood, dash, firewall or engine cover liner for a vehicle.

BACKGROUND OF THE INVENTION

Acoustical and thermal liners for application to vehicles are well known in the art. These liners typically rely upon both sound absorption, i.e. the ability to absorb incident sound waves and transmission loss, i.e. the ability to reflect incident sound waves, in order to provide sound attenuation. They also rely upon thermal shielding properties to prevent or reduce the transmission of heat from various heat sources (e.g. engine, transmission and exhaust system), to the passenger compartment of the vehicle. Such insulation is commonly employed as a hoodliner, dash liner and firewall liner. More recently, such liners have been employed on engine covers so as to attenuate the sound of the engine closer to its source.

Examples of acoustical and thermal insulation in the form of liners are disclosed in a number of prior art patents including U.S. Pat. No. 4,851,283 to Holtrop et al. and U.S. Pat. No. 6,008,149 to Copperwheat. As should be apparent from a review of these two patents, engineers have generally found it necessary to construct such liners from a laminate incorporating (a) one or more layers to provide the desired acoustical and thermal insulating properties and (b) one or more additional layers to provide the desire mechanical strength properties which allow simple and convenient installation as well as proper functional performance over a long service life.

While a number of adhesives, adhesive webs and binding fibers have been specifically developed over the years to secure the various layers of the laminates together, laminated liners and insulators have an inherent risk of delamination and failure. The potential is, in fact, significant mainly due to the harsh operating environment to which such liners and insulators are subjected. Many liners and insulators are located near and/or are designed to shield high heat sources such as the engine, transmission and components of the exhaust system. As a result, the liners and insulators are often subjected to temperatures in excess of 200 F which have a tendency to degrade the adhesives or binders over time.

Additionally, many liners and insulators are subjected to water from the surface of the roadways which has a tendency to be drawn by capillary action into the interface between the layers of the liners or insulators. Such water may have a deleterious effect upon the integrity of the adhesive layer over time. This is particularly evident when one considers that water may also include in solution salt or other chemicals from the roadway, which are corrosive and destructive.

A need is therefore identified for a hood, dash, firewall or engine cover liner incorporating a nonlaminate acoustical and thermal insulating layer of polymer fibers which avoids any inherent potential for delamination. Such a liner is suitable for use in the high temperature operating environment of the engine compartment and capable of providing the desired mechanical strength and rigidity for ease of installation as well as the desired acoustical and thermal insulating properties.

SUMMARY OF THE INVENTION

Accordingly, it is a primary object of the present invention to provide a hood, dash, firewall or engine cover liner for a vehicle. That liner comprises a nonlaminate acoustical and thermal insulating layer of polymer fiber selected from a group consisting of polyester, polypropylene, polyethylene, rayon, nylon and any mixtures thereof. The thermal insulating layer is preferably a nonwoven fabric and may further include additional fibers selected from a group consisting of glass fibers and natural fibers to meet the specific performance requirements of a particular application.

In accordance with one aspect of the present invention the acoustical and thermal insulating layer may include a relatively high density, nonlaminate skin of polymer fiber along at least one face thereof. Still further, the liner may include a first facing layer over a first face of the acoustical and thermal insulating layer. Similarly, a second facing layer may be provided over a second face of the acoustical and thermal insulating layer. Either of the facing layers may be constructed from a polymer material selected from a group consisting of polyester, rayon, polyethylene, polypropylene, ethylene vinyl acetate, polyvinyl chloride and mixtures thereof. The first and second facing layer typically have a weight between about 0.50-3.00 ounces per square yard.

For aesthetic reasons more particularly described below, the acoustical and thermal insulating layer is typically white, gray or black in color. It should be appreciated, however, that substantially any appropriate color may be provided so that the acoustical and thermal insulating layer may be made approximately the same color as the first and/or second facing layer if desired for a particular application.

More specifically describing the invention, the hood, dash, firewall or engine cover liner of the present invention may comprise a nonlaminate acoustical and thermal insulating layer of polymer fiber selected from a group consisting of polyester, polypropylene, polyethylene, rayon, nylon and any mixtures thereof that shows no signs of any thickness increase, delamination, deterioration or any undesirable effect which may affect performance when subjected to a temperature of about 150° C. for a period of at least 330 hours. Still more specifically describing the invention, the hood, dash, firewall or engine cover liner may comprise a nonlaminate acoustical and thermal insulating layer of substantially 100% polyethylene terephthalate.

The benefits and advantages of the present invention will become readily apparent to those skilled in this art from the following description wherein there is shown and described several preferred embodiments of this invention, simply by way of illustration of some of the modes best suited to carry out the invention. As it will be realized, the invention is capable of still other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
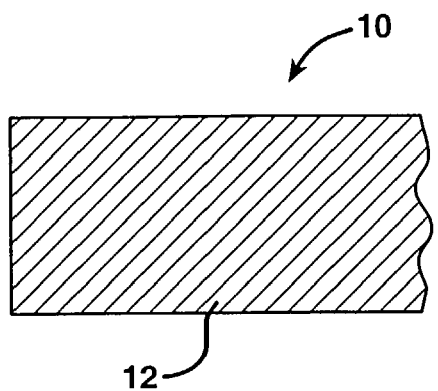
FIG. 1 is a schematical side elevational view of one possible embodiment of the present invention.

Reference is now made to FIG. 1 showing a first embodiment of the hood, dash, firewall or engine cover liner 10 of the present invention. The liner 10 comprises an acoustical and thermal insulating layer 12 of polymer fiber. More specifically, a single, nonlaminated layer 12 is provided with the necessary mechanical strength and rigidity to allow easy installation and the desired acoustical and thermal insulating properties. Advantageously, all of these benefits are achieved in a light weight liner 10 which may even be used in compact vehicles where fuel economy concerns lead manufacturers to seek weight savings wherever possible.

Figure 5:
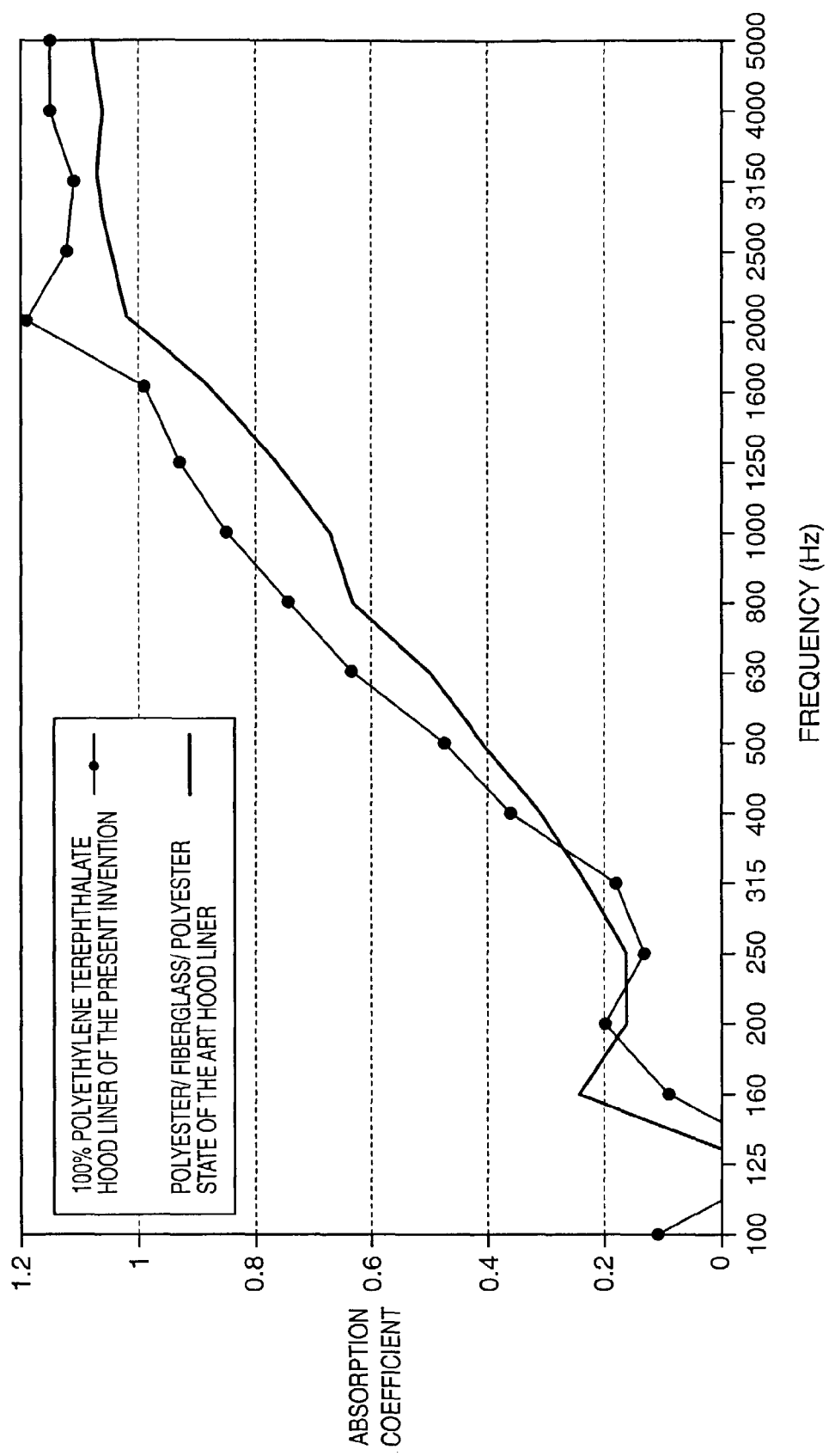
FIG. 5 is a graphical illustration comparing the acoustical insulating performance of a 100% polyethylene terephthalate liner of the present invention with a state of the art polyester and fiberglass liner of sandwich construction.

As best shown in FIG. 5, a hood liner 10 of the present invention constructed of 100% polyethylene terephthalate provides an absorption coefficient over a frequency range of from 1-18 hertz that is generally superior to that of a state of the art hood liner constructed from a layer of fiberglass sandwiched between two layers of polyester when tested in accordance with ASTM C423. Further, the hood liner 10 of the present invention has a weight per unit area of only 60 g/ft$^2$ while the state of the art hood liner has a weight per unit area of 90 g/ft$^2$. Thus, the hood liner of the present invention provides generally equal or superior acoustical performance at approximately a 33% weight savings.

The polymer fiber is not foamed, non-needled, and typically is a nonwoven fabric. The polymer fiber may be selected from a group of fibers consisting of polyester, polypropylene, polyethylene, rayon, nylon and any mixtures thereof. The acoustical and thermal insulating layer 12 is engineered to show no signs of any thickness increase, delamination, deterioration or any undesirable effect which may affect performance when subjected to a temperature of approximately 150° C. for a period of at least 330 hours. Advantageously, such a liner 10 has a weight per unit are of between about 40-130 g/ft$^2$. Thus, for example, the acoustical and thermal insulating layer 12 may comprise substantially 100% polyethylene terephthalate.

Figure 2:
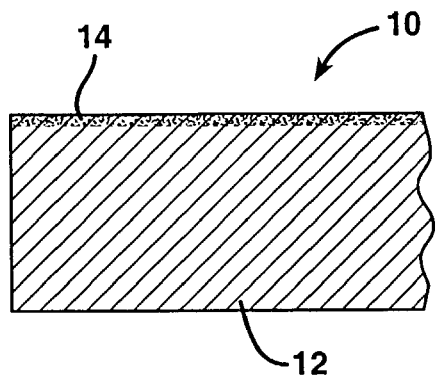
FIGS. 2-4 are schematical side elevational illustrations of other possible alternative embodiments of the present invention.

In a first alternative embodiment shown in FIG. 2, the liner 10 also comprises a single, nonlaminated acoustical and thermal insulating layer 12 of polymer fiber (e.g. a nonwoven fabric) selected from a group consisting of polyester, polypropylene, polyethylene, rayon, nylon and any mixtures thereof. The layer 12 also includes a relatively high density, nonlaminate or unitary skin 14 of that polymer fiber along at least one face thereof. The formation of the relatively high density, nonlaminate skin 14 of polymer fiber may be completed in accordance with the process described in detail in co-pending U.S. patent application Ser. No. 09/607,478, entitled "Process For Forming A Multi-Layer, Multi-Density Composite Insulator", filed Jun. 30, 2000 (Owens Corning Case Nos. 24811 and 24812). The full disclosure of this document is incorporated herein by reference.

Advantageously, the high density skin 14 will not delaminate from the layer 12 under the environmental conditions existing in the engine compartment and also adds structural integrity and strength to the liner 10 which aids significantly in handling and fitting the part during installation. The high density skin 14 is also more aesthetically pleasing. Still further, for many applications the high density skin 14 eliminates the need to provide an additional facing layer of another type of fabric material. This serves to virtually eliminate any potential for failure of the lining due to delamination. It also results in a liner 10 made exclusively of one material that is, therefore, fully recyclable.

Further, since the skin may be formed with a hot platen during the molding of the liner 10 to its desired shape, no additional processing step is required. This reduces production cost relative to a liner with a fabric or other facing since such a facing must be adhered to the acoustical and thermal insulating layer in a separate processing step.

Figure 3:
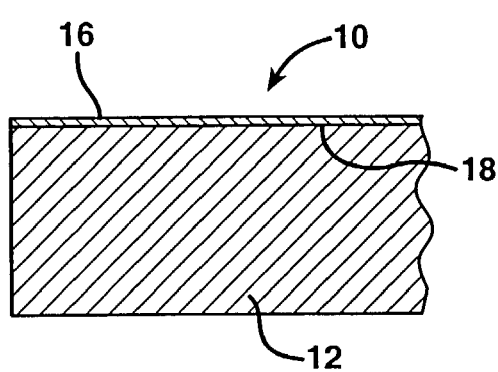

In yet another embodiment shown in FIG. 3, the liner 10 includes a single, nonlaminated acoustical and thermal insulating layer 12 of polymer fiber (e.g. a nonwoven fabric) selected from a group consisting of polyester, polypropylene, polyethylene, rayon, nylon and any mixtures thereof in combination with a facing layer 16 over a first face 18 of the acoustical and thermal insulating layer. The facing layer 16 may be constructed from a polymer material selected from a group consisting of polyester, rayon, polyethylene, polypropylene, ethylene vinyl acetate, polyvinyl chloride and mixtures thereof.

Figure 4:
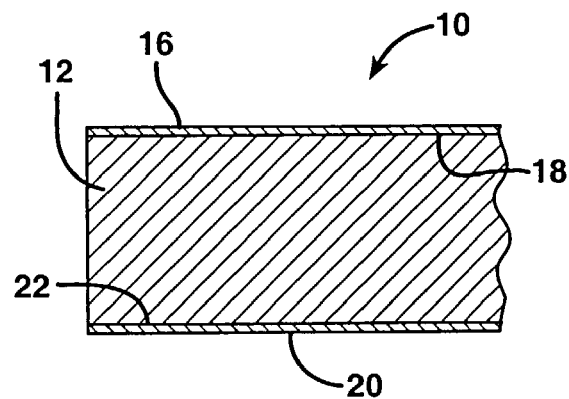

In yet another alternative embodiment shown in FIG. 4, the liner 10 comprises a single, nonlaminated acoustical and thermal insulating layer 12 of polymer fiber as described above in combination with a first facing layer 16 covering a first face 18 thereof and a second facing layer 20 covering a second, opposite face 22 thereof. The second facing layer 20 may be constructed from the same or a different material as the first facing layer 16. Preferably the first and second facing layers have a weight of between about 0.50-3.00 ounces per square yard.

In accordance with yet another aspect of the present invention, the acoustical and thermal insulating layer 12 may be a natural white or include any appropriate form of coloring or pigment in order to provide a gray or black color. Alternatively, the acoustical and thermal insulating layer 12 may incorporate any appropriate color or pigment so as to substantially approximate the color of the first and/or second facing layers 16, 20 and/or the paint color of the vehicle. This provides significant aesthetic benefits. Specifically, when the liner 10 is molded under heat and pressure in order to nest with the hood, firewall or other appropriate body panel or superstructure of the engine compartment, the liner 10 is often subjected to deep drawing at one or more points. This deep drawing has a tendency to spread the weave of the fabric facing 16, 20 thereby exposing a portion of the underlying face 18, 22 of the acoustical and thermal insulating layer to light. If the acoustical and thermal insulating layer 12 does not substantially match the color of the facing layer 16, 20 this creates an undesirable color variation in these deep drawn areas. In contrast, by matching the color of the layer 12 with the facings 16, 20, this color variation may be substantially eliminated.

It should further be appreciated that during use the facing layer 16, 20 may become snagged or subjected to a partial tear exposing some of the face of the underlying acoustical and thermal insulating layer 12. Once again, by matching the color of the layer 12 with the facing 16, 20, any color variation is substantially eliminated and one's attention is not as readily drawn to the damaged area. Accordingly, an overall improved aesthetic appearance is maintained over the service life of the liner 10.

In any of the embodiments described above and illustrated in FIGS. 1-4, the acoustical and thermal insulating layer 12 may further include from about 10-60 weight percent of glass and/or natural fibers such as, but not limited to E-glass, S-glass, kenaf, hemp and mixtures thereof. Use of such glass and natural fibers may be desirable to meet the performance parameters necessary for some potential applications.

In summary, numerous benefits result from employing the concepts of the present invention. A hood, dash, firewall or engine cover liner 10 constructed in accordance with the teachings of the present invention provides a unique combination of mechanical strength and rigidity as well as thermal and acoustical insulating properties which are consistently and reliably maintained over a long service life even in the high temperature and high moisture operating environment of the engine compartment. Such performance characteristics have heretofore been unavailable in a liner incorporating a single, nonlaminated layer of acoustical and thermal insulating material. In one of the embodiments of the present invention, a relatively high density, nonlaminate skin is provided which aids in handling, is aesthetically pleasing and maintains the full recycleability of the liner. In another embodiment the color of the acoustical and thermal insulating layer and any fabric facing that might be present are substantially matched so as to provide a more aesthetically pleasing product which can better maintain a high quality appearance over a longer service life.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the liner 10 could include a relatively high density nonlaminate skin 14 on both opposing faces and/or along the edges of the liner. Additionally, a liner 10 with one or more high density, nonlaminate skins 14 could also include one or more facings 16, 20 if required to meet the aesthetic requirements of a particular application.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. An acoustic and thermal insulator for a vehicle, comprising:
   a hood, dash, firewall or engine cover liner including a nonlaminate, non-needled multidensity acoustical and thermal insulating layer of polymer fiber selected from a group consisting of polyester, polypropylene, polyethylene, rayon, nylon and any mixtures thereof, and also including a nonlaminate skin of polymer fiber along at least one face of said acoustical and thermal insulating layer, said nonlaminate skin having a higher density than a remaining portion of said insulating layer.

2. The insulator of claim 1, wherein said acoustical and thermal insulating layer is a nonwoven fabric.

3. The insulator of claim 1, wherein said acoustical and thermal insulating layer further includes additional fibers selected from a group consisting of glass fibers and natural fibers.

4. The insulator of claim 1, including a first facing layer over a first face of said acoustical and thermal insulating layer, said facing layer being constructed from a polymer material selected from a group consisting of polyester, rayon, polyethylene, polypropylene, ethylene vinyl acetate, polyvinyl chloride and mixtures thereof.

5. The insulator of claim 4, including a second facing layer over a second face of said acoustical and thermal insulating layer.

6. The insulator of claim 5, wherein said first and second facing layer has a weight of between about 0.50-3.00 ounces per square yard.

7. The insulator of claim 5, wherein said acoustical and thermal insulating layer, said first facing layer and said second facing layer are approximately the same color.

8. The insulator of claim 4, wherein said acoustical and thermal insulating layer is white and said first facing layer is black.

9. The insulator of claim 4, wherein said acoustical and thermal insulating layer and said first facing layer are approximately the same color.

10. The insulator of claim 1, wherein said acoustical and thermal insulating layer is gray or black in color.

11. The insulator of claim 1, wherein the acoustic and thermal insulating layer is polymer fiber selected from a group consisting of polyester, rayon, and any mixtures thereof.

12. A hood, dash, firewall or engine cover liner for a vehicle, comprising:
    A nonlaminate, non-needled multidensity acoustical and thermal insulating layer of substantially 100% polyethylene terephthalate nonwoven fabric having a relatively high density skin along at least one face thereof.

13. The liner of claim 12, including a first facing layer over a first face of said acoustical and thermal insulating layer, said first facing layer being constructed from a polymer material selected from a group consisting of polyester, rayon, polyethylene, polypropylene, ethylene vinyl acetate, polyvinyl chloride and mixtures thereof.

14. The liner of claim 13, wherein said acoustical and thermal insulating layer and said first layer are approximately the same color.

15. The liner of claim 13, including a second facing layer over a second face of said acoustical and thermal insulating layer.

16. The liner of claim 15, wherein said first and second facing layer has a weight of between about 0.50-3.00 ounces per square yard.

17. The liner of claim 15, wherein said acoustical and thermal insulating layer, said first facing layer and said second facing layer are all approximately the same color.

18. The liner of claim 12, wherein said acoustical and thermal insulating layer is gray or black in color.

19. An acoustical and insulating device for a vehicle, comprising:
    A hood, dash, firewall or engine cover liner including a nonlaminate, non-needled multidensity acoustical and thermal insulating layer of polymer fiber selected from a group consisting of polyester, polypropylene, polyethylene, rayon, nylon and any mixtures thereof that shows no signs of any thickness increase, delamination, deterioration or any undesirable effect which may affect performance for at least 330 hours at 150 degrees C., and also including a nonlaminate skin of polymer fiber along at least one face of said acoustical and thermal insulating layer, said nonlaminate skin having a higher density than a remaining portion of said insulating layer.

20. The insulator of claim 19, wherein said acoustical and thermal insulating layer is a nonwoven fabric.

21. A hood, dash, firewall or engine cover liner for a vehicle, comprising:

A nonlaminate, non-needled multidensity acoustical and thermal insulating layer of polymer fiber selected from a group consisting of polyester, polypropylene, polyethylene, rayon, nylon and any mixtures thereof, and also including a nonlaminate skin of polymer fiber along at least one face of said acoustical and thermal insulating layer, said nonlaminate skin having a higher density than a remaining portion of said insulating layer; and a first facing layer over a first face of said acoustical and thermal insulating layer, said facing layer being constructed from a polymer material selected from a group consisting of polyester, rayon, polyethylene, polypropylene, ethylene vinyl acetate, polyvinyl chloride and mixtures thereof.

22. The liner of claim 21, including a second facing layer over a second face of said acoustical and thermal insulating layer.

* * * * *